Patented Mar. 14, 1950

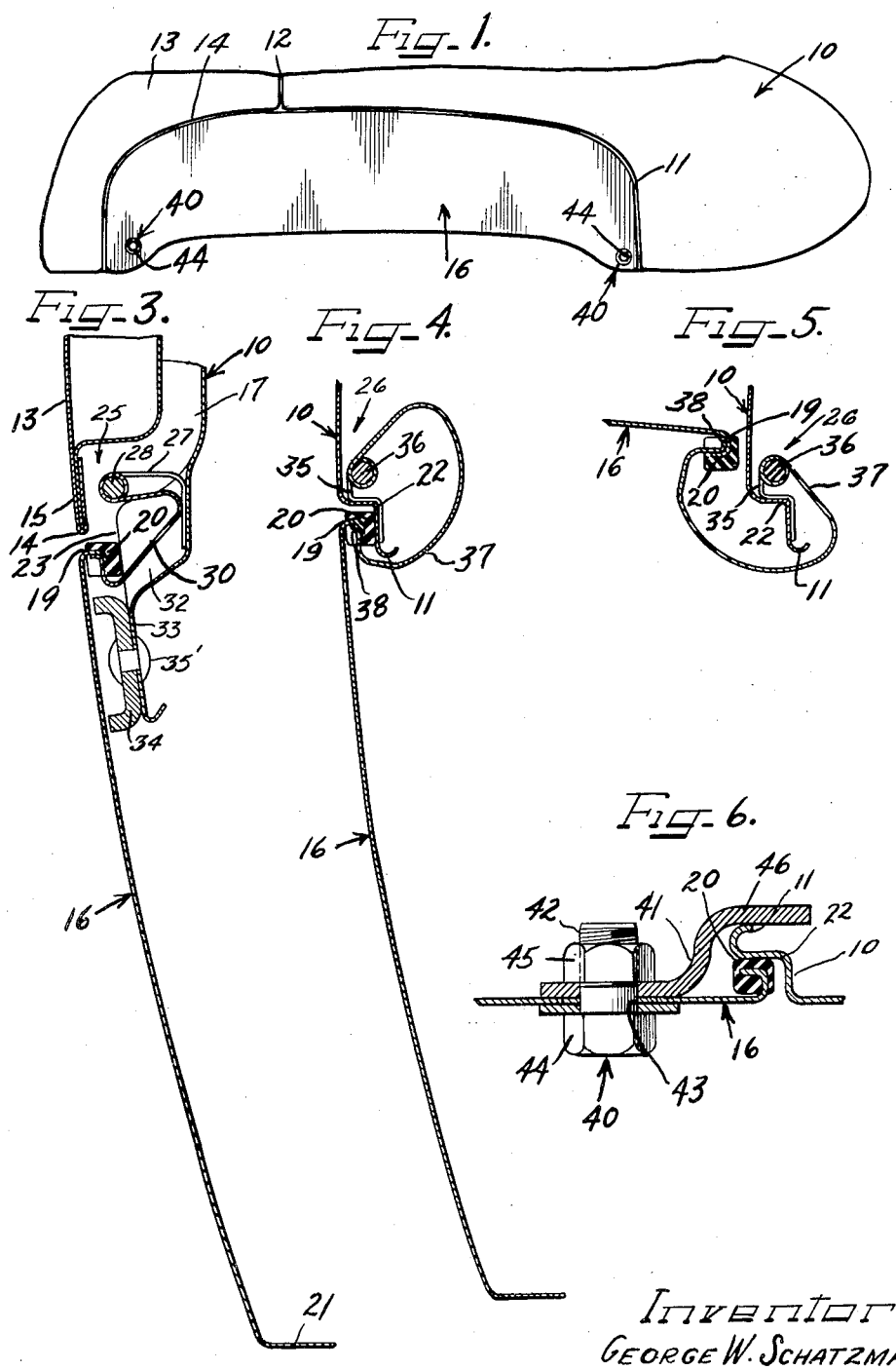
March 14, 1950 — G. W. SCHATZMAN — 2,500,207
FENDER SHIELD STRUCTURE
Filed June 1, 1946 — 2 Sheets-Sheet 1
Inventor
GEORGE W. SCHATZMAN

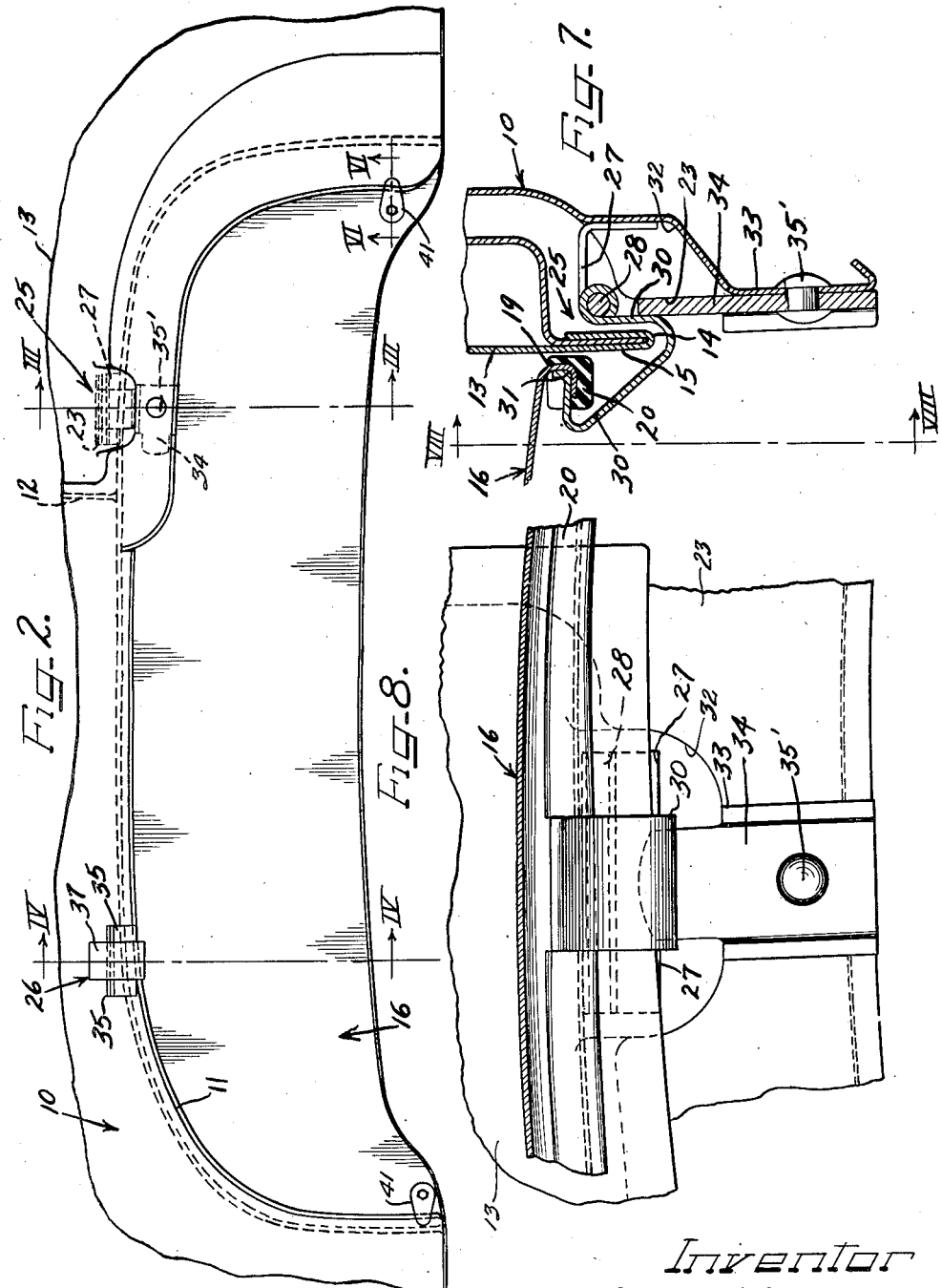

2,500,207

UNITED STATES PATENT OFFICE 2,500,207

FENDER SHIELD STRUCTURE

George W. Schatzman, Detroit, Mich., assignor to Houdaille-Hershey Corporation, Detroit, Mich., a corporation of Michigan Application June 1, 1946, Serial No. 673,785

9 Claims. (Cl. 280—153)

This invention relates to a shield or skirt for a fender, and more particularly to an improved mounting for a shield on an automobile fender.

An object of this invention is to provide a fender shield structure which can be pivotally attached to an automobile fender, and which can be held in open position while access is being had to an automobile wheel without necessitating removal of the shield from the fender.

Still another object of this invention relates to the provision of an improved pivotal mounting for a fender shield or skirt which will support the shield on the fender in such a manner that the shield can be moved in and out of the fender opening and relative to a door partially surrounding the opening without necessitating opening of the door.

Still another object of the invention relates to the provision of a fender and shield structure wherein the fender is partly offset rearwardly around the opening to receive a portion of a door and wherein the shield is adapted to fit in an opening defined in part by the shield and in part by a margin of the door.

Yet another object of the invention relates to the provision of an improved mounting for a fender shield or skirt which lends itself to economical manufacture as well as to application to the vehicle while it is being assembled on a production assembly line.

In accordance with the general features of this invention, there is provided a fender shield for covering a wheel opening in a fender and having a pivotal connection at its upper margin to the fender, as well as means for holding the shield in open position when it is swung upwardly out of the opening to afford access to the wheel therebehind.

Another feature of the invention relates to the offsetting of the portion of the fender edge to which the shield is pivotally attached so that a portion of a door may lap the fender about the wheel opening in such a manner as to not interfere with the pivotal movement of a shield in and out of the opening.

Yet another feature of the invention relates to the provision of latching means for holding the fender shield in a closed position and in such a manner as to not interfere with the opening of the door which partially laps a fender about the wheel opening.

Other objects and features of this invention will become more apparent from the following detailed description taken in connection with the accompanying drawings which illustrate a single embodiment thereof and in which Figure 1 is a fragmentary outer side view of a fender structure embodying the features of this invention and showing the shield or skirt in a wheel opening, partly defined by a fender and partly by a curved margin of a vehicle door, disposed in lapping relation with the fender;

Figure 2 is a fragmentary inner view of the structure shown in Figure 1, and showing the location of the hinges at the upper portion of the shield, as well as the latching means at the lower extremities of the same;

Figure 3 is a fragmentary cross-sectional view taken on the line III—III of Figure 2 looking in the direction indicated by the arrows, and showing the fender shield in closed position;

Figure 4 is a fragmentary cross-sectional view taken on the line IV—IV of Figure 2 and through the other hinge of the shield;

Figure 5 is a fragmentary sectional-view similar to a portion of Figure 4 and showing the shield in an open position;

Figure 6 is a fragmentary cross-sectional view taken on the line VI—VI of Figure 2 and more particularly through one of the latching arms looking upwardly;

Figure 7 is a fragmentary cross-sectional view similar to a portion of Figure 3, but showing the shield in open position and the holding arm swung upwardly for engaging and retaining the shield in open position; and Figure 8 is a fragmentary view taken on the line VIII—VIII of Figure 7 looking in the direction indicated by the arrows and showing more clearly how the holding lug cooperates with one of the hinges of the shield for holding the shield in its open position.

As shown on the drawings:

The reference character 10 designates generally an automobile fender which may be of any suitable material, and is adapted to be attached in the usual way to the body of a vehicle. This fender defines an opening 11 commonly termed a wheel opening for affording access to the rear wheel of a vehicle when the shield is removed therefrom, as shall be described hereinafter.

The fender 10 is slightly offset beginning at 12 and continuing to the left in Figure 1 so as to define a seat for a portion of a vehicle door 13. The door 13 is curved or notched out at 14 so as in effect to afford a continuation of the fender opening 11.

It will be noted from Figure 3 that the door edge 14 is defined by a marginal portion 15 of the door which is adapted to be flush with a fender shield or skirt designated generally by the reference character 16. In other words, the major portion of the fender defining the opening 11 and the door portion 15 are arranged to be disposed symmetrically in a common plane and to, in effect, constitute a continuation of the wall of the fender shield 16 when the latter is in closed position. I have in Figure 3 shown the offset of the fender, which more particularly is defined by an offset marginal portion 17 on the fender 10.

The curved edge 14 of the door is such as not to interfere with the swinging movement of the shield from closed to open position. In other words, the shield 16 is so supported by hinges, to be hereinafter described, that it can be moved from closed to open position and vice versa, without interference with the door.

The fender shield 16 is of a bowed or convex-concave cross-sectional shape, such as to be symmetrical with the general curvature of the fender wall. In fact when the shield is in a closed position it is substantially flush with the outer wall of the fender 10 or, in other words, fits inside of the normal fender opening 11. It is also substantially flush with the curved outer wall of the door, as described hereinbefore, in connection with Figure 3.

This shield 16 may comprise a sheet metal stamping, and includes an upper turned edge 19 suitably embedded in a cushioning strip 20 of resilient material, such as rubber or synthetic plastic. The lower edge of the shield 16 may be likewise turned rearwardly into a flange 21.

It will be noted that the major portion of the margin of the fender defining the seat for the shield comprises a stepped flange 22 (Figure 4) against which the rubber strip 20 is adapted to tightly rest.

This stepped flange 22 is disposed to the right of the offset portion 17, shown in Fig. 3. To the left of the offset portion 17, shown in Figure 3, the rubber strip 20 is adapted to bear against a marginal portion 23 of the fender 10 to the inside of the door which laps the same. However, the marginal portion 23 is aligned with the stepped flange 22.

Now, in order to support the shield 16 on the fender 10, there are provided two hinges designated generally by the reference characters 25 and 26 (Figure 2). The hinge structure 25 is located to the inside of the door portion 13, as shown in Figure 2.

As best shown in Figure 7, the hinge 25 includes fixed pintle arms 27—27 for carrying a pintle or hinge pin 28, and a movable pintle arm 30 mounted on the pin 28 between the two fixed arms 27—27. The two fixed arms 27—27 comprise one plate of a door-type hinge, and are fixed to the fender 10 to the inside of the door margin 15. The movable pintle arm or plate 30 is suitably fastened, as by means of welding, at 31 to the curved outer margin 19 of the fender shield 16. It will be noted from Figure 7 that the rubber strip 20 is recessed to receive the shield margin 19 and the extremity of the hinge arm 30 fastened thereto.

Also, the arm 30 is of an angular and curved construction, such that it can clear and move around the door edge 14 in the swinging of the shield from open to closed position, and vice versa. For clearing the hinge arm 30 to swing about its pivot in the opening and closing of the fender shield, a clearance offset 32 is formed in the marginal portion 23 of the fender (Figs. 3, 7 and 8).

The margin of the fender 10 is also provided with an extension 33, to which is pivotally attached an arm or lug 34. Any suitable pivot pin 35' may be employed for attaching the arm or lug 34 to the fender. When the arm 34 is in disengaged position, it is disposed as shown by the dotted lines in Figure 2 and in full lines in Figure 3. However, when the shield is swung to open position, the arm or lug 34 can be manually swung upwardly to the position shown in Figure 7 in which it can engage the rear surface of the pintle arm 30 carried by the shield for holding the shield in an open or upward position. It will be noted that this engagement of the arm 34 with the movable hinge member 30 is directly below the pintle pin 28 of the hinge 25. For reinforcement purposes and to facilitate turning the holding arm 34, at least the pivoted end portion thereof is preferably preformed in channel shape.

When the shield 16 is in its closed position, as shown in Figure 3, the hinge arm 30 will be pivoted to its rearmost position in which it is rearwardly of the outer plane of the door 13 and is substantially concealed. On the other hand when the shield is moved to its open position, as shown in Figure 7, the hinge arm 30 is swung outwardly about the pivot of pin 28 and around the inner edge 14 of the door.

Now, as noted before, in addition to the hinge 25 there is a further hinge 26, which is between the upper margin of the shield 16 and the fender 10 (Figure 2). This hinge, as best shown in Figure 4, includes fixed spaced arms 35 which carry a pintle pin 36. The angular arms 35 may be suitably attached to the rear surface of the stepped portion 22 on the inner margin of fender 11. Extending between the hinge arms 35 and pivoted on the pin 36 is a curved or looplike movable arm 37, the free end of which is suitably fastened, as by means of welding, at 38 to the inner turned margin 19 of the shield 16. As in the case of the hinge member 30, this hinge member 37 extends into a slot or cut-away portion in the rubber bead 20 so that it is attached to the edge 19 of the skirt inside of the bead 20.

The pintle pin 36 has its axis aligned with that of the pin 28 of the other hinge 25, so that the shield may be easily swung about a common axis extending through both of the hinges 25 and 26. When the shield 16 is in its closed position, as shown in Figure 4, the curved movable hinge member 37 will extend around the inner edge of the fender defining the opening 11, and is substantially concealed behind the shield 16 and the fender 10. On the other hand, when the shield 16 is moved to its open position, the movable hinge member 37 will move around the inner edge of the fender 10 (as shown in Figure 5).

In order to hold the fender shield tightly seated against the inner margin of the fender 10 with the rubber bead 20 under compression, I preferably provide the shield 16 at its ends with latching or fastening devices 40—40. Since these devices are identical a description of one will suffice for both.

Referring to Figure 6, it will be noted that the shield 16 has pivotally fastened to its rear side an angular latching arm 41. This arm has extending through it a bolt stud 42. The arm may be suitably splined to the stud so as to rotate with the same upon turning of the bolt. The stud of the bolt 42 extends through an opening 43 in the shield 16 and has its outer end provided with a hexagonal head 44. The inner end of the stud 42 has threaded on it a nut 45 for clamping the arm against the inner surface of the shield 16.

The arm 41 has its free extremity offset rearwardly at 46 so as to tightly engage the fender edge defining the opening 11.

When the latching arm 41 is in the position shown in Figure 6 it tightly clamps the shield in resilient or cushioned engagement with the stepped portion 22 of the fender 10. By turning the nut 45, it is possible to disengage the offset portion 46 of the arm 41 from engagement with the fender. Thus when both of the latching devices 40—40 are turned to disengaged positions, the shield thereafter may be swung upwardly about the axes of the hinge pins 28 and 36. Also, as described before, the shield may be held in its uppermost position as shown in Figure 7 by manually swinging the latching lug 34 upwardly behind the movable hinge arm 30 of hinge 25.

From the foregoing, it is clear that I have provided a fender shield or skirt which may be held in tight cushioned engagement with the margin of a fender defining a wheel opening, and which may be readily swung to open position without interference with a door partly disposed around the fender opening. In addition, after the fender shield has been swung to open position, it may be held in that position so as to enable ready access to the wheel behind the fender opening. This eliminates the need for detaching the shield from the fender or of inconveniencing the operator in having to hold the shield in an open position while getting to the wheel behind the opening.

I claim as my invention:

1. In a fender structure including a margin defining a wheel opening, and partially inset at one end of the opening to define a seat for a door having a cut-out portion defining a margin fitted around the wheel opening, a shield for covering said opening, hinge means between a top portion of said shield and said fender margin for pivotally supporting the shield whereby it may be swung upwardly to expose the opening, and means for holding said shield in upwardly swung position, said hinge means being attached to the inset portion of the fender inside of the door margin.

2. In a fender and fender shield assembly, a fender having a wheel access opening, a fender shield arranged to close said opening, a hinge attaching the fender shield to the fender and having a member secured to the fender shield and including a shoulder, and a holding member on said fender mounted to be swung pivotally into engagement with said shoulder when the fender shield is swung open, whereby the fender shield is held in the open position by the interengagement of the pivoted member and the shoulder of the hinge member.

3. In a combination in a fender and fender shield assembly, a fender having a wheel access opening, a fender shield closing said opening, a marginal portion of the fender defining said opening being inset relative to the remainder of the fender margin, a hinge assembly connecting the fender shield and the inset marginal portion of the fender, and a second hinge assembly connecting the fender shield to said remainder of the fender margin, both of said hinge assemblies having hinge pivots disposed on a common axis, the hinge assembly connected to the inset marginal portion of the fender including an arm projecting outwardly relative to said inset portion and pivotally supporting the portion of the hinge assembly which is connected in association therewith and to the fender shield, the length of said arm being such as to compensate for the inset of said inset margin relative to the remainder of the fender margin.

4. In combination in a fender and fender shield assembly, a fender having an access opening, a fender shield closing said opening, and a hinge assembly connecting the upper portion of the fender shield to the margin of the fender defining the upper portion of the wheel access opening, said assembly including an angular member secured to the fender and having an arm projecting outwardly therefrom, and a generally hook shaped member pivotally secured to the outer end of said arm and fixedly secured to the upper portion of the fender shield, said hook shaped member in the closed condition of the fender shield underlying said arm and in the open position of the fender shield projecting outwardly beyond said arm.

5. In combination in a fender and fender shield assembly, a fender having an access opening, a fender shield closing said opening, and a hinge assembly connecting the upper portion of the fender shield to the margin of the fender defining the upper portion of the wheel access opening, said assembly including an angular member secured to the fender and having an arm projecting outwardly therefrom, a generally hook shaped member pivotally secured to the outer end of said arm and fixedly secured to the upper portion of the fender shield, said hook shaped member in the closed condition of the fender shield underlying said arm and in the open position of the fender shield projecting outwardly beyond said arm, and a holding bar pivotally secured to the fender and arranged to be swung pivotally behind said hook shaped member to engage the same and hold the latter against return and thereby holding the fender shield open.

6. In a fender structure including a margin defining a wheel opening, said margin being inset at one end of the opening to define a seat for a door having a marginal portion fitting in front of the inset fender margin, a fender shield for covering said opening, and hinge means between a top portion of the fender shield and said inset fender margin portion for pivotally supporting the fender shield whereby it may be swung upwardly to expose the opening, said hinge means being attached to the inset portion of the fender margin inside of the door margin.

7. In a fender and fender shield assembly, a fender including a wheel access opening having a margin inset in a portion thereof to define a seat for a door margin, a fender shield for closing said opening, and a hinge assembly for hingedly securing the fender shield to the fender including a portion secured to said inset marginal portion of the fender behind the door and a portion of generally hook shape secured to the fender shield and adapted to permit opening of the fender shield while the hook shaped portion extends about the margin of the door.

8. In a fender and fender shield combination, a fender having a wheel access opening, a fender shield for closing said opening, a portion of the fender margin about the wheel access opening being inset to accommodate a door of the vehicle with which the fender shield may be associated, said inset portion having an inset pocket therein, and hinge means securing the fender shield to the fender and accommodated and mounted within said inset pocket in said inset marginal portion of the fender.

9. In combination in a fender and fender shield construction, a fender having a wheel access opening, an inturned integral flange formed on the fender along the top of said opening, a fender shield for closing said opening having an inturned flange along the top thereof, and hinge means for supporting the fender shield hingedly for upward swinging opening movement with respect to said opening including a hinge member mounted upon and extending above said inturned flange on the fender and a hinge member secured to the fender shield under the inturned fender shield flange, the hinge members being pivotally connected above said fender flange, said hinge member carried by the fender shield extending hook-like inwardly and upwardly clear of the fender shield and fender flanges and having an upper outwardly extending extremity portion which is pivotally connected to the fender-carried hinge member, whereby the fender shield is swingable upwardly into open position with said hook-like hinge member extending around the fender flange, the hook-like hinge member having a loop portion within which the fender flange is accommodated in the swung-open position of the fender shield.

GEORGE W. SCHATZMAN.

REFERENCES CITED

The following references are of record in the file of this patent:

UNITED STATES PATENTS

| Number | Name | Date |
| --- | --- | --- |
| 590,711 | Spencer | Sept. 28, 1897 |
| 2,031,219 | Koch | Feb. 18, 1936 |
| 2,126,579 | Roethel | Aug. 9, 1938 |
| 2,157,793 | Lang | May 9, 1939 |
| 2,196,030 | Schatzman | Apr. 2, 1940 |
| 2,222,624 | Mills | Nov. 26, 1940 |
| 2,352,374 | Fergueson et al. | June 27, 1944 |
| 2,394,014 | Schonitzer | Feb. 5, 1946 |